US009876650B2

(12) United States Patent
Lee et al.

(10) Patent No.: US 9,876,650 B2
(45) Date of Patent: Jan. 23, 2018

(54) METHOD FOR CONTROLLING FUNCTIONS OF DEVICE INCLUDED IN HOME NETWORK

(75) Inventors: Jong-Hyo Lee, Pyeongtaek-si (KR); Je-Young Maeng, Suwon-si (KR); Ho-Yeon Park, Seoul (KR); Joo-Yeol Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 428 days.

(21) Appl. No.: 13/086,809

(22) Filed: Apr. 14, 2011

(65) Prior Publication Data

US 2011/0257769 A1 Oct. 20, 2011

(30) Foreign Application Priority Data

Apr. 14, 2010 (KR) .......................... 10-2010-0034363
Apr. 13, 2011 (KR) .......................... 10-2011-0034235

(51) Int. Cl.
*H04L 12/00* (2006.01)
*H04L 12/28* (2006.01)

(52) U.S. Cl.
CPC ........ *H04L 12/2809* (2013.01); *H04L 12/282* (2013.01)

(58) Field of Classification Search
CPC ..... H04L 12/24; H04L 12/2809; H04L 41/00; H04L 41/0809; H04L 41/12; H04L 41/0273; H04L 41/0266; H04L 12/2823; H04L 12/2805; H04L 12/2803; H04L 12/2818; H04L 43/08; H04L 41/06; H04L 12/2827; H04L 29/12547; H04L 67/025;
(Continued)

(56) References Cited

U.S. PATENT DOCUMENTS 6,167,265 A * 12/2000 Kim et al. ..................... 455/433
7,117,051 B2 * 10/2006 Landry et al. .................. 700/83
2001/0038392 A1 11/2001 Humpleman et al.
(Continued)

FOREIGN PATENT DOCUMENTS

JP 2000-512472 9/2000
JP 2007-025948 2/2007
(Continued)

OTHER PUBLICATIONS

European Search Report dated Jan. 28, 2016 issued in counterpart application No. 11769096.6-1505, 9 pages.
(Continued)

*Primary Examiner* — Christopher E Everett
(74) *Attorney, Agent, or Firm* — The Farrell Law Firm, P.C.

(57) ABSTRACT

A method for controlling functions of a Management Device (MD) included in a home network is provided. The method for controlling the functions of the MD by a Control Device (CD) in a home network system including the CD for controlling functions of an Electronic Device (ED) connected to a home network and the MD, the functions of which are managed by the CD, includes diagnosing at least one function performed by the MD; identifying information necessary to control the at least one function; and transmitting, to the MD, control information for controlling the at least one function, in consideration of the information necessary to control the at least one function.

18 Claims, 3 Drawing Sheets

(58) Field of Classification Search
CPC .. H04L 63/08; H04L 61/2582; H04L 12/2834
See application file for complete search history.

(56) References Cited

U.S. PATENT DOCUMENTS

| | | | |
|---|---|---|---|
| 2005/0066197 A1* | 3/2005 | Hirata et al. | 713/201 |
| 2005/0144262 A1* | 6/2005 | Kang et al. | 709/220 |
| 2005/0203647 A1* | 9/2005 | Landry et al. | 700/83 |
| 2005/0286427 A1* | 12/2005 | Hutter | 370/241 |
| 2006/0031888 A1* | 2/2006 | Sparrell | 725/78 |
| 2006/0179138 A1* | 8/2006 | Van Gassel et al. | 709/225 |
| 2006/0184615 A1* | 8/2006 | Park et al. | 709/203 |
| 2007/0055998 A1* | 3/2007 | Kang et al. | 725/81 |
| 2007/0101395 A1* | 5/2007 | Cha | H04N 5/76 725/134 |
| 2007/0115996 A1* | 5/2007 | Shitano et al. | 370/392 |
| 2007/0233841 A1* | 10/2007 | Jin et al. | 709/223 |
| 2007/0261064 A1* | 11/2007 | Jin et al. | 719/318 |
| 2007/0271595 A1* | 11/2007 | Jin et al. | 726/3 |
| 2007/0288608 A1 | 12/2007 | Sung et al. | |
| 2008/0120405 A1 | 5/2008 | Son et al. | |
| 2008/0133979 A1* | 6/2008 | Lee et al. | 714/48 |
| 2008/0140842 A1* | 6/2008 | Kwang-Il et al. | 709/226 |
| 2008/0209034 A1* | 8/2008 | Shin et al. | 709/224 |
| 2008/0320177 A1* | 12/2008 | Jung et al. | 710/18 |
| 2009/0094484 A1* | 4/2009 | Son | G06F 11/0709 714/26 |
| 2009/0157198 A1 | 6/2009 | Morikawa | |

FOREIGN PATENT DOCUMENTS

| | | |
|---|---|---|
| JP | 2007-156691 | 6/2007 |
| JP | 2009-044476 | 2/2009 |
| JP | 2009-175884 | 8/2009 |
| JP | 2009-179043 | 8/2009 |
| JP | 2010-015244 | 1/2010 |
| KR | 100791298 | 1/2008 |

OTHER PUBLICATIONS

UPNP Forum, "UPNP Device Management Simplify the Administration of Your Devices", XP055243006, Apr. 2011, 18 pages.
Francois Gael Ottogalli et al., "Manageable Device:1 Device Template Version 1.01 for UPNP Version 1.0, Standardized DCP (SDLP)", Jul. 20, 2010, 14 pages.
European Search Report dated Jan. 28, 2016 issued in counterpart application No. 11769096.6-1505, 9 pages

* cited by examiner

| FUNCTION | WHETHER ERROR HAS OCCURRED |
|---|---|
| FUNCTION 1 | 0 |
| FUNCTION 2 | 0 |
| FUNCTION 3 | 1 |
| FUNCTION 4 | 0 |
| FUNCTION 5 | 0 |

FIG.2

METHOD FOR CONTROLLING FUNCTIONS OF DEVICE INCLUDED IN HOME NETWORK

PRIORITY

This application claims priority under 35 U.S.C. §119(a) to a Korean Patent Application entitled "Method for Controlling Functions of Device Included in Home Network" filed in the Korean Intellectual Property Office on Apr. 14, 2010 and assigned Serial No. 10-2010-0034363, and a Korean Patent Application filed in the Korean Intellectual Property Office on Apr. 13, 2011 and assigned Serial No. 10-2011-0034235, the entire contents of both of which are incorporated herein by reference.

BACKGROUND OF THE INVENTION

1. Field of the Invention

The present invention relates generally to a method for managing a device included in a home network, and more particularly to a method for controlling the functions of a device in a home network.

2. Description of the Related Art

It is normal for a home network to include Internet Protocol (IP)-based private networks. The home network connects various apparatuses, including a Personal Computer (PC), intelligent products, a wireless apparatus, and the like in a home, through middleware corresponding to a common virtual computing environment into one network, and controls them. By connecting the various apparatuses in the home network in a peer-to-peer scheme, the middleware enables communication between the various apparatuses. Home Audio Video Interoperability (HAVI), Universal Plug and Play (UpnP), Java Intelligent Network Infra-structure (Jini), Home Wide Web (HWW), and the like have been proposed as home network middleware.

A UPnP network is a home network technology, which is currently the most frequently used, and defines a UPnP device, a UPnP service and a protocol between the UPnP device and UPnP service. The UPnP network includes a controlled device corresponding to a home network device controlled while being connected to an IP-based home network, and a Control Point (CP) corresponding to a device for controlling the controlled device.

First, the CP, which is a device for controlling the controlled device, requests the controlled device for an event, and then receives the requested event from the controlled device.

The controlled device, which is a device for performing a function determined by the request of the CP, transmits the requested event to the CP, which has requested the event, when the state of the controlled device changes.

The UPnP network devices configured as described above can perform an advertisement process, a discovery process, a description process, a control process, and an eventing process. The advertisement process is a process by which a new controlled device is connected to a home network and then notifies other devices in the home network of its existence. The discovery process is a process by which a new CP is connected to the home network and then searches for controlled devices operating in the home network. The description process is a process by which in order to control the controlled devices, the CP detects the functions of a newly added device by parsing a service description eXtensible Markup Language (XML) file or a device description XML file using IP addresses of the searched controlled devices. The control process is a process by which when intending to provide a particular service through a relevant controlled device, the CP transmits, to the relevant controlled device, a control message (i.e. an action request) for requesting a predetermined service by using the Simple Object Access Protocol (SOAP) according to a UPnP device architecture, and then receives a response message (i.e. a result and variable value) to the transmitted control message.

The eventing process is a process for checking information regarding a changed state of the controlled device, which has provided the predetermined service, by a control command transmitted from the CP.

In the UPnP network, as described above, it is possible to detect errors of service functions performed by devices connected to the UPnP network. However, in order to solve the problems after detecting the errors of the service functions performed by the devices, it is inconvenient in that the relevant device, which has caused the error, should be rebooted. Further, problems may also occur in that after the relevant device, which has caused the error, is rebooted, it must repeatedly attempt to connect to the UPnP network.

SUMMARY OF THE INVENTION

Accordingly, the present invention has been made to solve the above-mentioned problems occurring in the prior art, and the present invention provides a method by which a service function, in which an error has occurred, can be limited while maintaining a connection of a device, which has caused the error, to a home network.

In accordance with an aspect of the present invention, a method for controlling functions of a Management Device (MD) by a Control Device (CD) in a home network system is provided, with the CD controlling functions of an Electronic Device (ED) connected to a home network and the MD. The method includes diagnosing at least one function performed by the MD; identifying information necessary to control the at least one function; and transmitting, to the MD, control information for controlling the at least one function, in consideration of the information necessary to control the at least one function.

In accordance with another aspect of the present invention, a method for controlling functions of a MD by the MD in a home network system is provided including the CD for controlling functions of an ED connected to a home network and the MD, functions of which are managed by the CD. The method includes: transmitting a result of diagnosing to the CD after diagnosing at least one function performed by the MD; identifying information necessary to control the at least one function from the CD, and then providing the identified information to the CD; receiving control information, which has been generated based on the information necessary to control the at least one function, from the CD; controlling the at least one function by using the control information; performing a connection to another ED included in the home network; and providing a device description to another ED.

BRIEF DESCRIPTION OF THE DRAWINGS

The above and other features, aspects, and advantages of the present invention will be more apparent from the following detailed description taken in conjunction with the accompanying drawings, in which:

FIG. 2 illustrates information necessary to control functions of a MD, which is used in a method for controlling the functions of the MD included in a home network according to an embodiment of the present invention;

DETAILED DESCRIPTION OF THE EMBODIMENTS OF THE PRESENT INVENTION

Hereinafter, principles of operation of embodiments of the present invention will be described in detail with reference to the accompanying drawings. In the following descriptions of the present invention, a detailed description of known functions and configurations incorporated herein will be omitted when it is determined that the detailed description of the known functions and configurations may unnecessarily obscure the subject matter of the present invention. Also, terms described below, which are interpreted considering the functions in the present invention, can be different depending on user and operator's intention or practice, etc. Therefore, the terms should be interpreted based on the disclosure throughout this specification.

Figure 1:
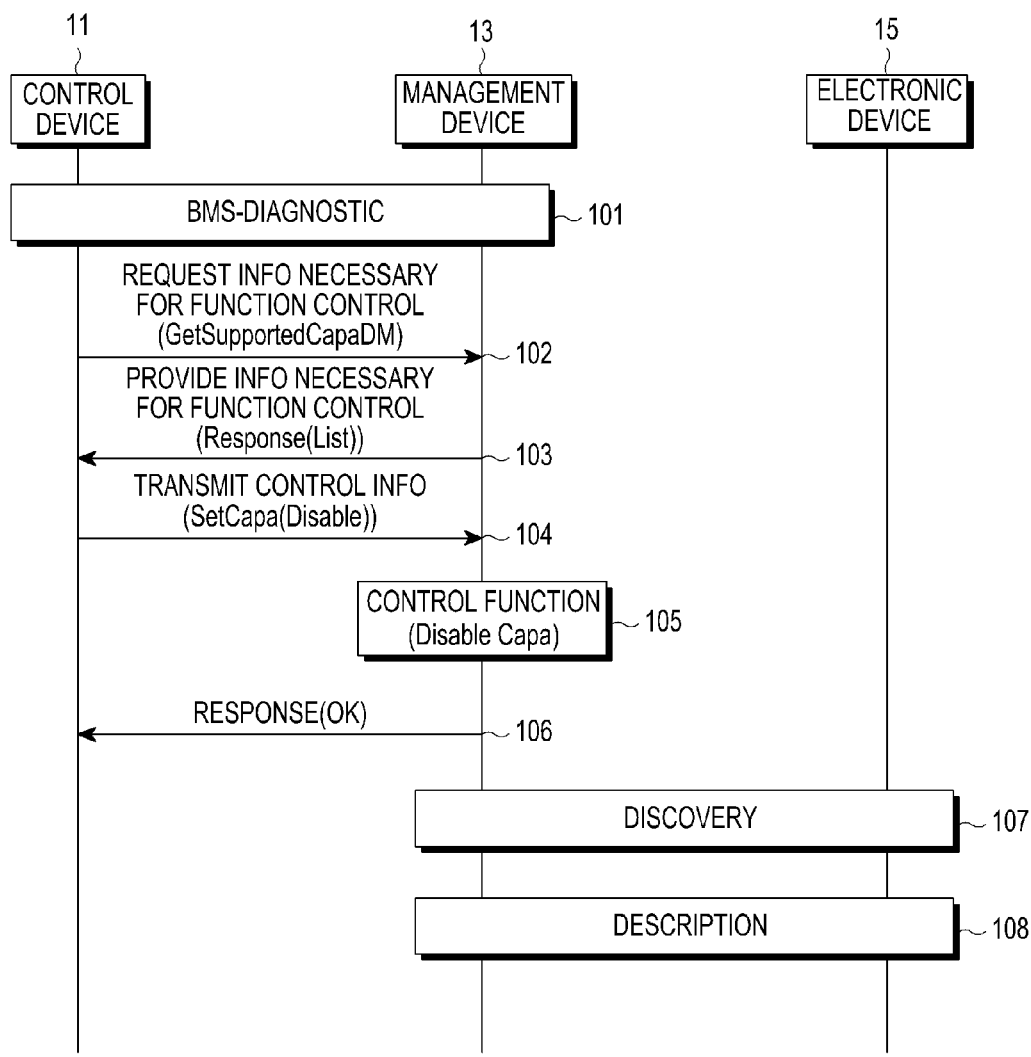
FIG. 1 illustrates a sequence diagram showing a method for controlling functions of a MD included in a home network according to an embodiment of the present invention.

FIG. 1 is a signal flow diagram showing a method for controlling functions of a Management Device (MD) included in a home network according to an embodiment of the present invention. Referring to FIG. 1, a method for controlling functions of the MD (13) included in the home network is performed by a Control Device (CD) 11.

For example, the CD 11 may be a PC, a portable terminal or a laptop, which functions as a PC in a Basic Management Service (BMS) for UPnP Device Management DM. Further, the MD 13 may be a TV (Television) or other device capable of performing the functions of various service data models.

Research has been conducted on UPnP telephony technology, in which, the transmission of call data, which has been received from the outside, to an apparatus in a house enables a user to answer the phone call through the apparatus in the house. According to UPnP, a UPnP telephony architecture includes a telephony terminal for receiving a telephone call from the outside, an ED in a house for receiving the transmission of a phone call data from the telephony terminal, and a CP for controlling the telephony terminal and the ED. The CP can control the functions of the telephony terminal and those of the ED by using a network, and controls a connection and media session establishment between the telephony terminal and the ED. The telephony terminal for receiving a phone call is a telephony server, and a telephony device for receiving phone call data transmitted from the telephony server is called a telephony client. A telephony CP controls the transmission of the phone call, which has been received by the telephony server, to the telephony client.

Further, the MD 13 may function as a telephony terminal, and the ED 15 may be a device which functions as a telephony server.

In the method for controlling the functions of the MD included in the home network according to the embodiment of the present invention, for controlling the MD 13, the CD 11 first performs a diagnostic process through the communication of itself with the MD 13 in step 101. The diagnostic process may be performed through a BMS diagnostic process as defined by a UPnP DM standard.

The CD 11 then transmits, to the MD 13, a message requesting information necessary to control at least one function of the MD 13 in step 102.

The information necessary to control the at least one function may be information necessary to activate/deactivate the function. For example, an error or a problem may occur in the function, and when an error or a problem occurs in the function, it is necessary to selectively deactivate only the function in which the error or the problem occurs. Therefore, in step 102, the CD 11 may transmit, to the MD 13, a request message including whether an error or a problem has occurred in the at least one function. In response to the reception of the message requesting the information necessary to control the function, the MD 13 determines whether an error or a problem has occurred in the function, and then provides the CD 11 with a result of the determination as the information necessary to control the function in step 103. For example, the information necessary to control the function may be generated by listing whether an error or a problem has occurred in the function, and then the generated information in list form may be provided as illustrated in FIG. 2. For example, the list as illustrated in FIG. 2 indicates that an error or a problem has occurred in function 3 whereas no errors or problems have occurred in functions 1, 2, 4 and 5. Further, function 3 may be a function of a telephony terminal.

In step 104, the CD 11 transmits, to the MD 13, control information for controlling the function, in consideration of the information necessary to control the function. For example, the control information may be control information for deactivating a function (e.g., function 3) in which an error or problem has occurred.

In step 105, the MD 13 deactivates a particular function (e.g., function 3) based on the control information, in order to control the function. In step 106, the MD 13 then transmits, to the CD 11, a response message including information indicating that the particular function (e.g., function 3) has been deactivated.

In step 107, the MD 13 performs discovery by communicating with the ED 15. The discovery process may be performed through device discovery defined by the UPnP DM standard. For example, when the ED 15, which functions as a CP, searches for the MD 13, which functions as a controlled device, by using an Simple Service Discovery Protocol (SSDP), by a response of the MD 13 to this search, the ED 15 and the MD 13 are interconnected. The MD 13 then notifies other devices, which are connected to the ED 15, of the connection between the itself (i.e., the MD) and the ED 15. Thereafter, the MD 13 periodically notifies other devices of whether it continues to be connected to the ED 15.

Finally, in step 108, the MD 13 provides a description by communicating with the ED 15. The process for providing a description may be performed through device description defined by the UPnP DM. For example, the MD 13 transmits a Uniform Resource Locator (URL) including a description to the ED 15, and then the ED 15 brings a description which has been made in an XML format by the MD 13. The description may include information indicating that a particular function (e.g., function 3) has been deactivated. Also, as an alternative to this configuration, it is also possible to provide a description, from which the particular deactivated function (e.g., function 3) has been deleted.

Further, the ED 15 transmits a notification massage, which indicates that the description has been updated, to devices connected to the home network of the ED 15. The notification message may also include information which directs all devices included in the home network to receive the updated description. Further, the notification message may include information indicating that the particular function (e.g., function 3) has been deactivated.

As described above, the information necessary to control the function is the information necessary to activate/deactivate the function, and is the information indicating whether an error or a problem has occurred in the function. However, the present invention is not limited to this configuration, and for example, the information necessary to control the function may be information necessary to change a setting state of the function. In this regard, in step 102, the CD 11 may transmit a message requesting a setting state of the function to the MD 13.

In step 103, the MD 13 may identify information on a setting state of the at least one function, and then transmit, to the CD 11, a list including information on a setting state of the function. Further, in steps 104 to 106, a process for controlling the setting of a function may be performed.

Figure 3:
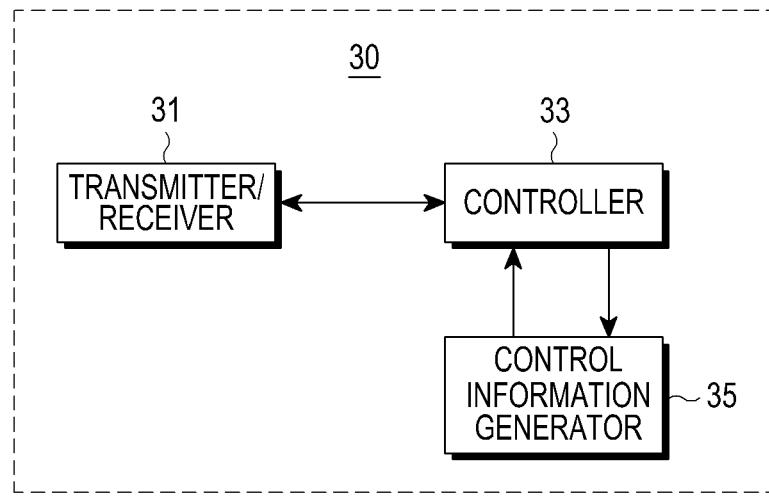
FIG. 3 illustrates the configuration of a CD according to an embodiment of the present invention.

FIG. 3 is a block diagram illustrating the configuration of a CD according to an embodiment of the present invention. Referring to FIG. 3, a CD according to an embodiment of the present invention includes a transmitter/receiver 31, a controller 33, and a control information generator 35.

While performing a BMS-diagnostic process defined by the UPnP DM standard, the controller 33 generates a message to be transmitted to the MD, or identifies information included in a message provided by the MD. Also, the controller 33 generates a message requesting information necessary to control a function, and then transmits the generated message through the transmitter/receiver 31. The controller 33 then identifies the information necessary to control the function provided by the MD, and then provides the identified information to the control information generator 35.

The control information generator 35 checks the information necessary to control the function, and then generates control information for controlling the MD. For example, when the information necessary to control the at least one function is a list indicating whether an error or a problem has occurred in the function as illustrated in FIG. 2, the control information generator 35 checks a function, in which an error or a problem has occurred, among the functions included in the list. Namely, in the list shown in FIG. 2, the control information generator 35 checks that an error or a problem has occurred in function 3 whereas no errors have occurred in functions 1, 2, 4 and 5. In response to the result of the check, the control information generator 35 generates control information for deactivating a function (e.g., function 3) in which an error or a problem has occurred. The generated control information is provided to the controller 33. After generating a message for transmitting the received control information to the MD, the controller 33 then transmits the generated message to the MD through the transmitter/receiver 31.

Figure 4:
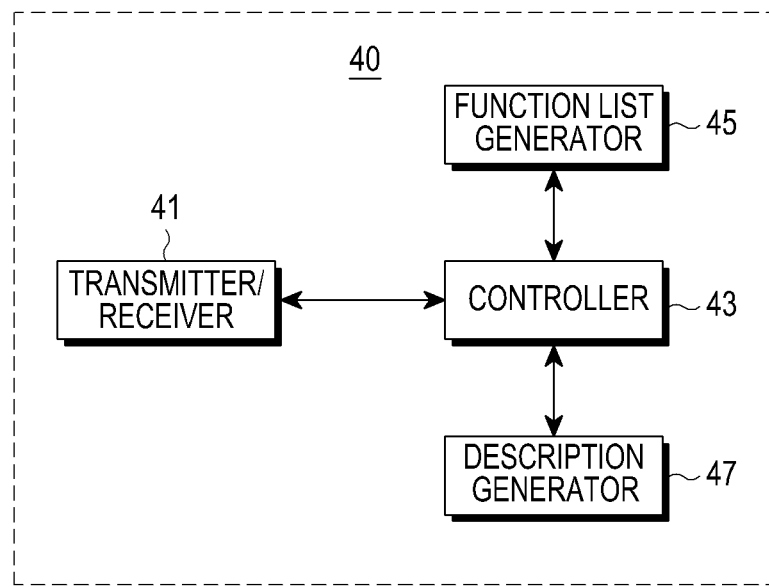
FIG. 4 illustrates the configuration of a MD according to an embodiment of the present invention.

FIG. 4 illustrates the configuration of a MD according to an embodiment of the present invention. Referring to FIG. 4, a MD according to an embodiment of the present invention includes a transmitter/receiver 41, a controller 43, a function list generator 45, and a description generator 47.

When performing a BMS-diagnostic process defined by the UPnP DM standard, the controller 43 defined by the UPnP DM standard generates a message to be transmitted to the CD, or identifies information included in a message provided by the CD. Further, the controller 43 checks a message requesting information necessary to control a function, which has been received through the transmitter/receiver 41. The controller 43 then requests the function list generator 45 to generate information necessary to control a function.

In response to the request of the controller 43, the function list generator 45 generates a list on functions performed in the MD, and provides the generated list to the controller 43. For example, a list on functions performed in the MD may include information indicating whether errors or problems exist in the functions performed in the MD. Namely, the list on the functions performed in the MD may include a list indicating whether an error or a problem has occurred in the at least one function as illustrated in FIG. 2. Moreover, the list on the functions performed in the MD may be information necessary to change a setting state of the at least one function. The function list generator 45 may generate a list including information on a setting state of the at least one function performed in the MD.

The controller 43 generates a message including the list on the functions performed in the MD, and then transmits the generated message to the CD through the transmitter/receiver 41.

When receiving control information from the CD through the transmitter/receiver 41, the controller 43 controls corresponding to the received control information. For example, when receiving control information for deactivating a function (e.g., function 3) in which an error has occurred, the controller 43 stops the function, the deactivation of which has been requested. The controller 43 then requests the description generator 47 to describe the activation or deactivation of the function performed in the MD. In response to the request of the controller 43, the description generator 47 makes and stores the description regarding the activation or deactivation of the function performed in the MD.

The controller 43 generates, in connection with the ED, a message for performing a discovery process, or checks a message provided by the ED. The discovery process may be performed through device discovery defined by the UPnP DM standard. For example, when the ED, which functions as a CP, transmits a message notifying that it has searched for the MD including the controller 43, which functions as a controlled device, by using an SSDP, the controller 43 generates a message responding to the message transmitted from the ED, and then transmits the generated message to the ED. Thus, the ED and the MD including the controller 43 are interconnected. The controller 43 then generates a message notifying other devices, which are connected to the ED, of the connection between the MD and the ED, and transmits the generated message to other devices. Thereafter, the controller 43 transmits, to other devices, a message periodically notifying other devices whether the MD is still connected to the ED.

Moreover, the controller 43 performs, in connection with the ED, a process for providing a description. The process for providing a description may be performed through device description defined by the UPnP DM. For example, the controller 43 transmits a URL including a description to the ED, and then the ED brings a description generated by the description generator 47. The description may include information indicating that a particular function (e.g., function 3) has been deactivated. Also, as an alternative to this configuration, it is also possible to provide a description, from which the particular deactivated function (e.g., function 3) has been deleted.

Using the method for controlling functions of a MD included in a home network of the present invention, it is possible to effectively limit a service function, in which an error has occurred, while maintaining a connection of a device, in which an error has occurred, to the home network.

While the invention has been shown and described in detail with reference to certain embodiments thereof, it will be apparent to a person having ordinary knowledge in the technical field of the present invention that it is possible to practice not only the embodiments disclosed herein but also other modified embodiments without departing from the spirit and scope of the invention. Therefore, the spirit and scope of the present invention must be defined not by the described embodiments thereof but by the appended claims and their equivalents.

What is claimed is:

1. A method for controlling functions of a management device (MD) by a control device (CD) in a network including the CD for controlling functions of an electronic device (ED) connected to the network, the method comprising:
   sending a request to the MD for information on whether an error in at least one function of a plurality of functions performed in the MD connected to the network has occurred;
   receiving, from the MD, the information on whether the error in the at least one function of the plurality of functions performed in the MD connected to the network has occurred; and
   transmitting, to the MD, control information for controlling the MD to deactivate the at least one function of the plurality of functions in which the error had occurred while maintaining a connection of the MD connected to the network, according to the information.

2. The method of claim 1, wherein the control information corresponds to information necessary to deactivate the at least one function of the plurality of functions in which the error occurred or activate the other functions of the plurality of functions in which the error had not occurred.

3. The method of claim 1, wherein the control information corresponds to control information for deactivating the at least one function of the plurality of functions in which the error occurred or activating the other functions of the plurality of functions in which the error had not occurred.

4. The method of claim 1, wherein the information on whether the error in the at least one function of the plurality of functions has occurred includes a list comprising information on whether the error in the at least one function of plurality of functions has occurred.

5. The method of claim 1, wherein the control information corresponds to information necessary to change a setting state of the at least one function.

6. The method of claim 1, wherein the control information corresponds to control information for changing a setting state of the at least one function.

7. The method of claim 1, further comprising:
   requesting, from the MD, a setting state of the at least one function; and
   receiving, from the MD, a list including information on the setting state of the at least one function.

8. The method of claim 1, further comprising:
   generating a message to be transmitted to the MD and identifying information included in the message to be transmitted to the MD, while performing a diagnostic process for the at least one function.

9. A method for controlling functions of a management device (MD) by a control device (CD) in a network comprising the CD for controlling functions of an electronic device (ED) connected to the network, the method comprising:
   receiving, from the CD, a message requesting information on whether an error in at least one function of a plurality of functions performed in the MD connected to the network has occurred;
   determining whether the error in the at least one function of the plurality of functions performed in the MD connected to the network has occurred;
   transmitting, to the CD, the information on whether the error in the at least one function of the plurality of functions performed in the MD connected to the network has occurred;
   receiving control information for controlling the MD to deactivate the at least one function of the plurality of functions in which the error occurred while maintaining a connection of the MD connected to the network;
   deactivating the at least one function of the plurality of functions in which the error had occurred while maintaining the connection of the MD, based on the control information;
   performing a connection to another ED included in the network; and
   providing a device description to another ED.

10. The method of claim 9, wherein the control information corresponds to information necessary to deactivate the at least one function of the plurality of functions in which the error occurred or active the other functions of the plurality of functions in which the error had not occurred.

11. The method of claim 9, wherein the control information corresponds to control information for deactivating the at least one function of the plurality of functions in which the error occurred or activating the other functions of the plurality of functions in which the error had not occurred.

12. The method of claim 9, wherein the information on whether the error in the at least one function of plurality of functions has occurred includes a list including information on whether the error in the at least one function of plurality of functions has occurred.

13. The method of claim 9, wherein the control information corresponds to information necessary to change a setting state of the at least one function.

14. The method of claim 9, wherein the control information corresponds to control information for changing a setting state of the at least one function.

15. The method of claim 9, further comprising:
   receiving, from the CD, a message requesting a setting state of the at least one function; and
   transmitting, to the CD, a list including information on the setting state of the at least one function after checking the setting state of the at least one function.

16. The method of claim 9, further comprising:
   receiving a message generated by the CD and identifying information included in the message received by the CD, while performing a diagnostic process for the at least one function.

17. A terminal comprising:
   a transceiver configured to receive information from a control device (CD) of a network that includes the CD and a connected electronic device (ED); and
   a controller configured to:
   control receiving, via the transceiver, a request for information on whether an error in at least one function of a plurality of functions performed in the terminal connected to the network has occurred,
   control transmitting, via the transceiver, the information on whether the error in the at least one function of the plurality of functions performed in the terminal connected to the network has occurred, and control receiving, via the transceiver, control information for controlling the terminal to deactivate the at least one function of the plurality of functions in which the error had occurred while maintaining a connection of the MD connected to the network, according to the information.

18. A server comprising:
a controller configured to:
control functions of a terminal by a control device of a network,
control sending a request to the terminal for information on whether an error in at least one function of a plurality of functions performed in the terminal connected to the network has occurred,
control receiving, from the terminal, the information on whether the error in the at least one function of the plurality of functions performed in the terminal connected to the network has occurred, and
control transmitting, to the terminal, control information for controlling the terminal to deactivate the at least one function of the plurality of functions in which the error had occurred while maintaining a connection of the terminal connected to the network, according to the information.

* * * * *